United States Patent
Brueckner et al.

(10) Patent No.: US 11,263,465 B2
(45) Date of Patent: Mar. 1, 2022

(54) LOW-DIMENSIONAL ASCERTAINING OF DELIMITED REGIONS AND MOTION PATHS

(71) Applicant: Robert Bosch GmbH, Stuttgart (DE)

(72) Inventors: Marcel Brueckner, Sunnyvale, CA (US); Alexander Lengsfeld, Wedemark (DE); Philip Lenz, Holle (DE)

(73) Assignee: Robert Bosch GmbH, Stuttgart (DE)

( * ) Notice: Subject to any disclaimer, the term of this patent is extended or adjusted under 35 U.S.C. 154(b) by 307 days.

(21) Appl. No.: 16/213,239

(22) Filed: Dec. 7, 2018

(65) Prior Publication Data

US 2019/0188496 A1 Jun. 20, 2019

(30) Foreign Application Priority Data

Dec. 19, 2017 (DE) .......................... 102017223206.4

(51) Int. Cl.
*G06K 9/00* (2006.01)
*G06K 9/46* (2006.01)
*G06T 7/246* (2017.01)
*B60Q 9/00* (2006.01)
*G06T 7/20* (2017.01)
*G06T 7/12* (2017.01)

(52) U.S. Cl.
CPC .......... *G06K 9/00798* (2013.01); *B60Q 9/00* (2013.01); *G06K 9/4638* (2013.01); *G06T 7/12* (2017.01); *G06T 7/20* (2013.01); *G06T 7/246* (2017.01); *G06T 2207/20084* (2013.01); *G06T 2207/30236* (2013.01); *G06T 2207/30241* (2013.01); *G06T 2207/30256* (2013.01)

(58) Field of Classification Search
CPC ............. G06K 9/00798; G06K 9/4638; G06K 9/6271; G06K 9/00805; G06T 7/20; G06T 7/12; G06T 7/246; G06T 2207/30236; G06T 2207/30256; G06T 2207/20084; G06T 2207/30241
See application file for complete search history.

(56) References Cited

U.S. PATENT DOCUMENTS

| | | | |
|---|---|---|---|
| 2008/0162036 A1* | 7/2008 | Breed .................... | G08G 1/161 701/408 |
| 2015/0206015 A1 | 7/2015 | Ramalingam et al. | |
| 2017/0336794 A1* | 11/2017 | Shashua ................ | G01C 21/36 |

FOREIGN PATENT DOCUMENTS

| DE | 19802261 A1 | 7/1999 |
|---|---|---|
| DE | 19942223 A1 | 3/2001 |

(Continued)

OTHER PUBLICATIONS

Shelhamer et al., "Fully Convolutional Networks for Semantic Segmentation," arXiv:1605.06211 (2016).

*Primary Examiner* — Phuoc Tran
(74) *Attorney, Agent, or Firm* — Norton Rose Fulbright US LLP; Gerard Messina (57) ABSTRACT

An apparatus for ascertaining, from at least one image, a delimited region and/or a motion path of at least one object includes at least one artificial neural network (ANN) made up of several successive layers. The first layer of the ANN receives as input the at least one image or a part thereof. The second layer supplies as output a boundary line of the delimited region, a linear course of the motion path, or a portion of the boundary line or motion path. The dimensionality of the second layer is lower than the dimensionality of the first layer.

22 Claims, 5 Drawing Sheets

(56) References Cited

FOREIGN PATENT DOCUMENTS

| DE | 102005037273 A1 | 2/2007 |
| DE | 102016121864 A1 | 5/2017 |
| DE | 102017103123 A1 | 9/2017 |

* cited by examiner

LOW-DIMENSIONAL ASCERTAINING OF DELIMITED REGIONS AND MOTION PATHS

CROSS-REFERENCE TO RELATED APPLICATIONS

The present application claims priority under 35 U.S.C. § 119 to DE 10 2017 223 206.4, filed in the Federal Republic of Germany on Dec. 19, 2017, the content of which is hereby incorporated by reference herein in its entirety.

FIELD OF THE INVENTION

The present invention relates to ascertaining delimited regions and motion paths on the basis of images, in particular for use in land vehicles, water vehicles, or aircraft.

BACKGROUND

Robust environment sensing is of great significance for driver assistance or for at least partly automated driving. It is particularly important to determine the drivable area that is delimited by other vehicles or also by stationary objects such as walls and guardrails.

Increasing use has been made in recent years of machine learning methods, and especially "deep learning" methods, to allow robust detection of such environment features. A classification is often made on the basis of the measured data. An extreme case is so-called "semantic segmentation" (or "pixel labeling") of camera images, in which an associated class (e.g., road, car, building) is determined for each individual pixel. An example thereof is given in Shelhamer et al., "Fully Convolutional Networks for Semantic Segmentation," arXiv:1605.06211 (2016).

U.S. Pat. App. Pub. No. 2015/0206015 discloses an alternative approach. Here a one-dimensional graph is created in which each node corresponds to an image column. An energy function is created on the graph on the basis of a feature recognition. That energy function is maximized in order to determine the unoccupied area close to a moving object.

SUMMARY

In the context of the invention, an apparatus has been developed for ascertaining a delimited region, and/or a motion path of at least one object, from at least one image.

The delimited region can be, for example, a walkable or drivable region in the sense that it is devoid of specific objects with which a collision is to be avoided. The term nevertheless also encompasses, for example, the delimiting of a median strip or grass area from a roadway, of a house front from a window, of a lake from the beach, or of a walkway from water. The separation between the regions can also be merely semantic in nature, as in the example of two driving lanes that are separated from one another by a solid line.

The "motion path" indicates in general a sequence of locations at which the object is successively located. If that sequence additionally contains times at which the object is present at the respective locations, the term "trajectory" is used.

The "walkable region" or "drivable region" is not terminologically confined to the fact that the camera with which the image was acquired is mobile. The camera can also be stationary and, for example, can monitor the occupancy of a parking facility or of a site for a large event.

The "object" whose motion path is being determined is also not terminologically confined to an object on which the camera is mounted. The flow of traffic can be monitored, for example, with a camera installed in stationary fashion. A vehicle equipped with a mobile camera can likewise monitor not only its own motion path but also the motion paths of other vehicles, pedestrians, or any other objects.

The "image" is not confined terminologically to a specific type of image acquisition, and also not to the fact that the image is an optical image. Color images, grayscale images, and depth images, for example, are equally suitable. The image can have been acquired, for example, by a single camera, by a stereo camera, by a fisheye camera, or with a different contrast mechanism, for example structure from motion, lidar, or time of flight. The image can also derive from a fusion with images sensed using different cameras, from different angles of view, and/or using different contrast mechanisms.

The delimited region being investigated does not need to be located in front of a vehicle. In the context of a turning maneuver or lane changes, for example, an investigation can be made of the extent to which a "blind spot" not visible with mirrors is unoccupied.

The apparatus encompasses at least one artificial neural network (ANN) made up of several successive layers, a first layer of the ANN receiving as input the at least one image or a part thereof.

A second layer of the ANN is embodied to supply as output a boundary line of the delimited region, a linear course of the motion path, or a portion of the boundary line or motion path. The dimensionality of the second layer is lower than the dimensionality of the first layer.

The terms "first layer" and "second layer" are to be understood in this context merely for differentiation of the two layers from one another and are not limited, for example, such that the first layer is the layer located directly at the input of the ANN and the second layer is the layer that directly follows it. The "first layer" and "second layer" in the ANN can therefore certainly be preceded by several layers, and can also follow several layers.

The "dimensionality" of a layer of the ANN is to be understood in particular as the dimensionality of an input or output of that layer.

The dimensionality of the first layer can be understood, for example, as the dimensionality of the inputted image data. The dimensionality of the second layer can be understood, for example, as the dimensionality of a parameter space in which a parameterized representation of the boundary line or of the motion path is ascertained, or as the dimensionality of another form in which the boundary line or the motion path is ascertained.

The ANN is furthermore not limited to supplying exclusively the boundary line or the motion path. Various "second layers" in a single ANN can also, for example, supply several boundary lines or motion paths at once. The ANN can also, for example, supply, not only the boundary line, but also, in one working step, various classes of objects along the boundary line.

For example, the ANN can simultaneously supply the region of a vehicle's own lane, the region bounded by solid lines, the region up to the curb, and the paved region. Various driving functions can then utilize the respectively suitable region. For example, a tire protection function brakes before the curb, while a pedestrian protection system offers, in an emergency, travel even over the curb or beyond a solid line.

In an advantageous embodiment, the output that each layer of the ANN supplies has at most a dimensionality of the same magnitude as the input received by that layer of the ANN. No upsampling, which is particularly calculation-intensive, then occurs in the ANN. There can also be applications, however, in which that cost for interim upsampling is justified.

It has been recognized that semantic segmentation contains substantially more information than is necessary, for example, for managing driving tasks. If an expressway is enclosed by physical boundaries, for example, then the types of objects located beyond those impenetrable boundaries are no longer relevant. The outlay for detailed classification of pixels that refer to regions beyond the boundaries can therefore be completely eliminated.

A quantitative example will illustrate that the savings are quite considerable. A typical serial camera acquires, every second, 30 images of 1280×720 pixels. In order to segment those pixels into 10 classes of objects, a set of 10 probabilities that the pixel belongs to an object of the relevant class would be calculated each time for each pixel. That is a total of more than 276 million probabilities per second. Conversely, if what is desired, for example, is merely a boundary line of the walkable or drivable region which is parameterized by 64 polygon interpolation points, that line can involve calculation of only a maximum of 64*30*10=19,200 values per second, i.e., 10,000 times fewer. Further savings are possible if no inquiry is made at the boundary line as to the exact object type that respectively delimits the walkable or drivable region there.

In this example, the number of inputted image pixels (1280×720) can be understood as the dimensionality of the first layer, while the number of polygon interpolation points (64) can be understood as the dimensionality of the second layer. The dimensionality of the second layer is therefore smaller than the dimensionality of the first layer by a factor of more than 10,000.

It has furthermore been recognized that in a context of complete semantic segmentation using an ANN, a considerable additional outlay arises from the fact that the dimensionality of the inputted image is firstly successively reduced, but at the end must be increased again to its original value by upsampling. This outlay can be completely eliminated. A further consequence thereof is that the ANN requires considerably less memory.

The reduced outlay for calculation and memory has the consequence in turn that more-compact hardware, with lower energy consumption, is sufficient for implementation of the apparatus in hardware. In particular, in a context of at least partly automated driving, this is advantageous for the transition from the laboratory to production application.

The outlay is thus manageable even though the entire image is used as input. It is therefore not necessary, in order to reduce complexity, to subdivide the image into portions that are processed separately from one another. This is advantageous for the ANN training process, in which the entire scene context can be learned in each case, for example that vehicles drive on roads and that the sky is located in the upper part of the camera image.

Lastly, the ANN itself can also be designed a priori to be considerably smaller, since the problem to be solved is formulated in considerably more compact fashion. In other words, all that is asked for a priori is the information actually required for driving or for an assistance system that assists with driving.

Especially for use in vehicles, a compact representation of the delimited region or motion path as a (parameterized) line has the further advantage that it requires little bandwidth upon transfer to other systems within the vehicle. Bus systems, for example the CAN bus, have proven successful for communication between vehicle systems as a way to economize on material and weight for wiring harnesses. The ultimate reason why material and weight are saved is that many systems share a single medium. The transfer of high-resolution, fully semantically segmented images in such an environment consumes a comparatively large amount of bandwidth, so that other systems can have to wait before getting their transfers into the queue.

Conversion of the image into the boundary line or motion path occurs in the apparatus directly, i.e., with no special and possibly non-transparent preprocessing or post-processing of the data. Conversely, this also makes possible transparent and much less complex labeling of training images or training image sequences with "model solutions" for the boundary line or motion path. Instead of labeling each individual pixel in a training image with the class into which the ANN should sort the pixel in real-world operation, it is sufficient, for example, to plot into the training image the boundary line or motion path that the ANN should usefully ascertain in real-world operation.

Training of the ANN is thus considerably simplified and accelerated. It therefore becomes more practical for the developer of an application to carry out training entirely on its own rather than using a pre-trained ANN. The application developer can therefore purchase an ANN in hardware and use it freely without having to comply with separate licensing conditions for the training results stored therein.

Advantageously, at least two ANNs are provided. The first ANN is embodied to determine a boundary line between the delimited region on the one hand and a first object type delimiting that region on the other hand. The second ANN is embodied to determine a boundary line between the delimited region on the one hand and a second object type delimiting that region on the other hand.

The two ANNs can then each be trained in specialized fashion, mutually independently, to recognize one object type. As that training proceeds, this ensures that learning progress in terms of recognizing one object type is not achieved at the cost of recognizing another object type.

In particular, the ANNs can be mutually independently directed toward different requirements that are associated with the recognition of different object types. For example, roadway boundaries are static, i.e., their appearance does not spontaneously change. The perspective from which a preceding vehicle is sensed by a camera, on the other hand, can change spontaneously as the vehicle turns or changes lanes. Its appearance can also change, for example if the driver actuates turn signals or other lights or opens a convertible top while driving.

If several ANNs are present, it is further possible in particularly simple fashion to ascertain, together with the boundary line, a classification with which object types of the delimited region are individually delimited. For example, it is relevant for the planning of an at least partly automated journey whether the object is a stationary object or another vehicle. Avoidance of a collision with a stationary object depends only on the behavior of the ego vehicle, whereas with another vehicle the calculation includes the fact that the latter can, for example, spontaneously accelerate, decelerate, or change lanes. In the event a collision is no longer avoidable, the consequences of the accident can furthermore be mitigated by diverting the collision, by way of a control intervention, to a "more suitable" object. For example, an impact against a solid concrete wall, in which the deformation energy is absorbed by the front end (designed for that purpose) of the vehicle, has less severe consequences than becoming wedged under a semitrailer, which causes the deformation energy to be concentrated onto the passenger compartment. Accident consequences can also be mitigated, for example, by striving for the largest possible contact area between the ego vehicle and the collision object, in order to distribute the deformation energy over the largest possible area. It is to be assumed that there will be regulatory stipulations in this regard relating to the authorization of at least partly automated driving, in particular in order to protect "soft" traffic participants such as pedestrians or cyclists.

Particularly advantageously, regardless of the presence of two or several ANNs, the apparatus is therefore embodied in general to ascertain, at various positions along the ascertained boundary line of the delimited region, respective probabilities that the delimited region is bounded there by specific object types.

In a particularly advantageous embodiment, the outputs of the first ANN and of the second ANN are conveyed into at least one aggregator, the aggregator being embodied to ascertain an envelope of a superposition of the boundary lines supplied by the two ANNs as an only or additional boundary line of the delimited region.

An aggregator of this kind makes it possible, for example, to combine the outputs of several ANNs in flexible fashion so that different questions can be answered. A single output of an ANN can be used repeatedly. For example, not only roadway boundaries and guardrails, but in particular other vehicles, can be relevant for active driving control. On the other hand, for example, for planning as to whether the vertical clearance of an entrance is sufficient for a loaded vehicle, it is useful to block out other vehicles and instead to take into account more information regarding objects that limit the vertical clearance.

In general, aggregation with an envelope makes it possible to break down the determination of a comparatively complex boundary line into considerably simpler subtasks that can be carried out by the individual ANNs.

If only a single ANN is present, it can already inherently serve as an aggregator of several boundary lines ascertained simultaneously in the ANN.

The flexibility with which boundary lines and motion paths can be combined makes possible a large number of applications with no need to modify or retrain the underlying ANNs. For example, heights of objects can be identified, or objects can be abstracted to outlines (bounding boxes). Intended motion paths or trajectories for passing maneuvers can be checked as to whether the maneuver is safe in light of the expected behavior of other traffic participants.

Individual instances of objects can also be identified and tracked over a sequence of several images, for example by determining by regression, along the boundary line of the delimited region for each object, the distance (and its sign) in pixels to the center point of the respective object instance. By re-detecting object distances it is possible, for example, to simulate the behavior of an attentive human driver who, for example, tracks specific other vehicles in the environment of his or her own vehicle and actively looks in the "blind spot" if they are suddenly no longer visible.

Particularly advantageously, the ANN is embodied to supply the boundary line, the motion path, or the corresponding portion as a parameter set for a representation of the line with a parameterized function, and/or for a representation of a line in vector graphics. The parameterized function can be any continuous or discontinuous function. A polygon sequence, a polyline, a polynomial, a clothoid, or combinations thereof are particularly suitable. With these functions, even comparatively complex line sequences can be combined into only a few parameters.

The ANN is advantageously embodied to associate with each column of the image, or with a selection of columns of the image, at least one position within that column at which a boundary line of the delimited region proceeds. Determination of the boundary line is then reduced from a classification task to a regression task.

A motion path can also be determined analogously by regression. For that purpose, the ANN is advantageously embodied to associate with each row of the image, or with a selection of rows of the image, at least one position within that row at which the motion path proceeds.

Making a selection of columns or rows of the image decreases the number of interpolation points for the desired boundary line or motion path, and thus decreases the computation outlay at the cost of precision.

In a further advantageous embodiment the ANN is embodied to ascertain, over at least one line segment that traverses the image, the first occurrence of a boundary line of the delimited region. Specifically when managing driving tasks, only the boundary line that is closest in the intended direction of travel is relevant. With a forward-directed camera and forward travel, what is relevant is, for example, the first boundary line recognized starting from the lower edge of the image. In a context of intended turning maneuvers or lane changes, conversely, it can be useful to modify the direction in which the image is examined for the first occurrence of a boundary line.

The apparatus can be used, for example, in assistance systems for monitoring and/or controlling the motion of a vehicle or of another object. The vehicle can then, in particular, be an object whose motion path is monitored by the apparatus. The vehicle can be a land vehicle, water vehicle, or aircraft. The assistance system can serve to assist manual driving, but also at least partly automated driving.

In an advantageous embodiment, a comparison unit, which is embodied to monitor whether the motion path ascertained by the apparatus proceeds within a tolerance band, is provided in the assistance system. The comparison unit is additionally embodied to activate an acoustic, optical, or haptic warning device if the tolerance band is breached.

An assistance system of this kind can be, for example, a lane-keeping assistant that monitors whether the driver is remaining in a predetermined lane. If the driver is no longer staying in the lane, for example due to distraction or fatigue, and when that is detected by the apparatus, the warning device is activated by the comparison unit. Alternatively or in combination, an intervention in the heading of the vehicle can be effected by activating at least one actuator, bringing the future motion path of the vehicle back into the tolerance band.

The tolerance band can be defined, for example, at least partly by the boundary line, ascertained by the apparatus, of the delimited region. It is also possible, for example, to take into account in particular roadway markings. As mentioned earlier, it is advantageous in this context to use different ANNs to recognize the boundary line with respect to different object types.

Advantageously, at least one sensor and/or at least one interface is provided for sensing a heading and/or the speed of the vehicle. The heading can be sensed, for example, by way of a steering angle or rudder angle.

It is then possible to recognize, for example, whether the motion path of the vehicle is reacting in the expected way to a change in heading. If not, this can possibly be evaluated as an indication that the vehicle is skidding, and for correction, an ESP system can be correspondingly activated so that individual wheels are specifically braked.

In a particularly advantageous embodiment, a control loop is provided in which a deviation between the motion path ascertained by the apparatus and the sensed heading functions as a system deviation. The control loop is embodied to correct that system deviation by activating at least one actuator and/or at least one optical, acoustic, or haptic indicating apparatus.

For example, a strong side wind can make it necessary to countersteer so that the vehicle remains in its lane. If the vehicle then, for example, travels onto a bridge or, while passing, emerges from the wind shadow of a truck, the force of the impinging wind can suddenly change and necessitate a counter-reaction. Automating that counter-reaction using the assistance system can prevent the driver from being startled and, for example, jerking the steering wheel as an overreaction.

In a further advantageous embodiment, a control loop is provided which is embodied to regulate to a setpoint, and/or keep above a minimum level, a remaining distance and/or a remaining time until the boundary line ascertained by the apparatus is reached. In the context of an adaptive cruise control system, for example, a minimum spacing from the preceding vehicle specified as a distance or as a time (e.g., two-second rule) can therefore be maintained. The control intervention can be accomplished by activating at least one actuator but also, alternatively or in combination, by activating at least one optical, acoustic, or haptic indicating apparatus to prompt the driver to react.

The ANN can be implemented, in particular, entirely or partly in software. It can be executed, for example, in configurable hardware that, by way of software, imprints upon the layer structure the dimensionality that progressively decreases and does not increase again. In particular, an already existing apparatus can also be correspondingly reconfigured by way of software. A corresponding software program is in that regard an independently marketable product. The invention therefore also refers to a computer program having machine-readable instructions that, when they are executed on a computer and/or on a control device, upgrade the computer and/or the control device to yield an apparatus in accordance with the invention and/or cause it to perform the function of the comparison unit and/or of the control loop in the assistance system in accordance with the invention. The invention likewise also refers to a machine-readable data medium or a download product having the computer program.

Further features of example embodiments of the invention are presented in further detail below, together with a description of the preferred exemplifying embodiments of the invention with reference to Figures.

DETAILED DESCRIPTION

Figure 1A:
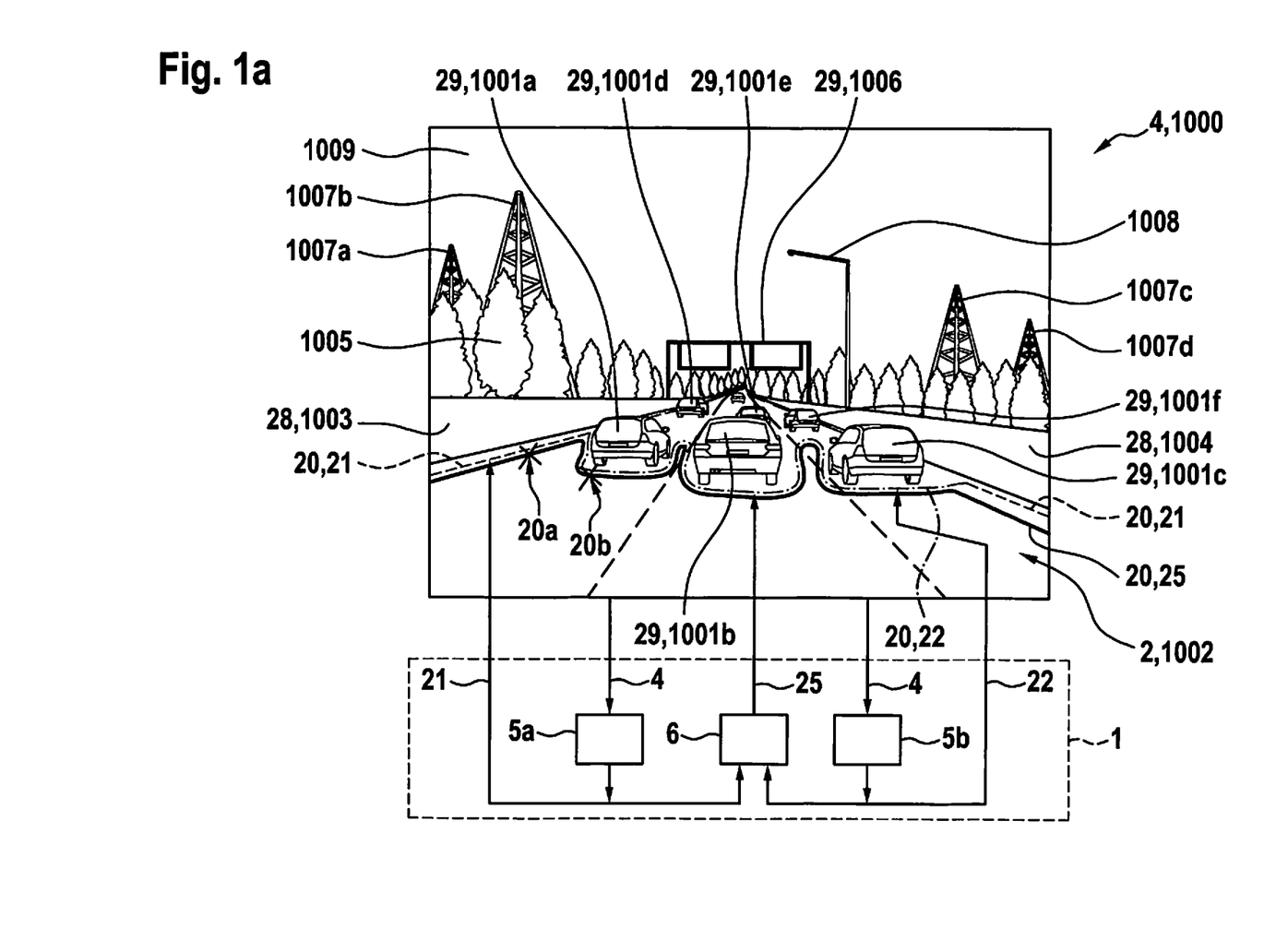
FIG. 1a shows an apparatus or determining boundary line 20 according to an example embodiment of the present invention.

According to FIG. 1a, image 4 acquired in a forward direction by a camera installed on a vehicle shows a scene 1000 having a plurality of objects 1001a-1009. A plurality of preceding vehicles 1001a-1001f are traveling on a roadway 1002 that is delimited by a left physical roadway boundary 1003 and a right physical roadway boundary 1004. Trees 1005, an overhead sign 1006, electrical pylons 1007a-1007d, a streetlight 1008, and lastly the sky 1009, are additionally visible. The open region of roadway 1002 located in front of the ego vehicle is drivable region 2.

The entire image 4 is delivered simultaneously to two ANNs 5a, 5b. First ANN specializes in ascertaining in image 4, starting from the lower edge, a boundary line 21 of drivable region 2 which is defined by objects of the "roadway boundary" object type labeled with the reference character 28. Second ANN 5b specializes in ascertaining in image 4, starting from the lower edge, a boundary line 22 of drivable region 2 which is defined by objects of the "other vehicle" object type labeled with the reference character 29.

The two boundary lines 21 and 22 are delivered to an aggregator 6 that determines a superposition of the two boundary lines 21 and 22 and determines therefrom an envelope 25. That envelope 25 is boundary line 20, supplied as an overall final result by apparatus 1, of drivable region 2.

Boundary line 20 can also be ascertained in one working step directly from image 4. It is then possible to classify, for example at positions 20a and 20b along boundary line 20, which object type is respectively relevant there in terms of the boundary course. In the example shown in FIG. 1a, at point 20a a high probability is identified that boundary line 20 is constituted there by the "roadway boundary" object type 28. At point 20b, on the other hand, there is a predominant probability of the "other vehicle" object type 29, but also a relevant probability of the "roadway boundary" object type 28.

Figure 1B:
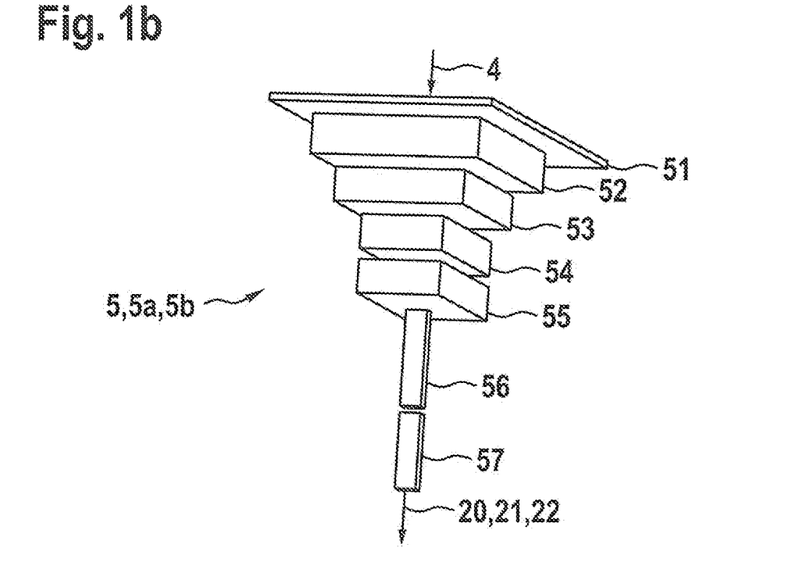
FIG. 1b is a diagram of an internal structure of an ANN according to an example embodiment of the present invention.

FIG. 1b schematically illustrates the internal structure of an ANN 5, 5a, 5b. ANN 5, 5a, 5b is made up here, by way of example, of seven layers 51-57 that are worked through from top to bottom in the perspective selected in FIG. 1b. First layer 51 receives image 4 as input. Last layer 57 supplies boundary line 20-22 of drivable region 2 as output. The dimensionality of layers 51-57 is indicated in FIG. 1b by the square base areas of the cuboids that symbolize the respective layers 51-57.

Proceeding from first layer 51, the dimensionality decreases toward layer 56, at first slowly and then more and more quickly, until it remains at a constant level at the transition to last layer 57. The output supplied by that last layer 57 is correspondingly also very low-dimensional. In comparison therewith, for a complete semantic segmentation of image 4, it would have been necessary for layer 57 to be followed by an upsampling to the original dimensionality of the inputted image 4. The considerable outlay required for that is eliminated.

Figure 2:
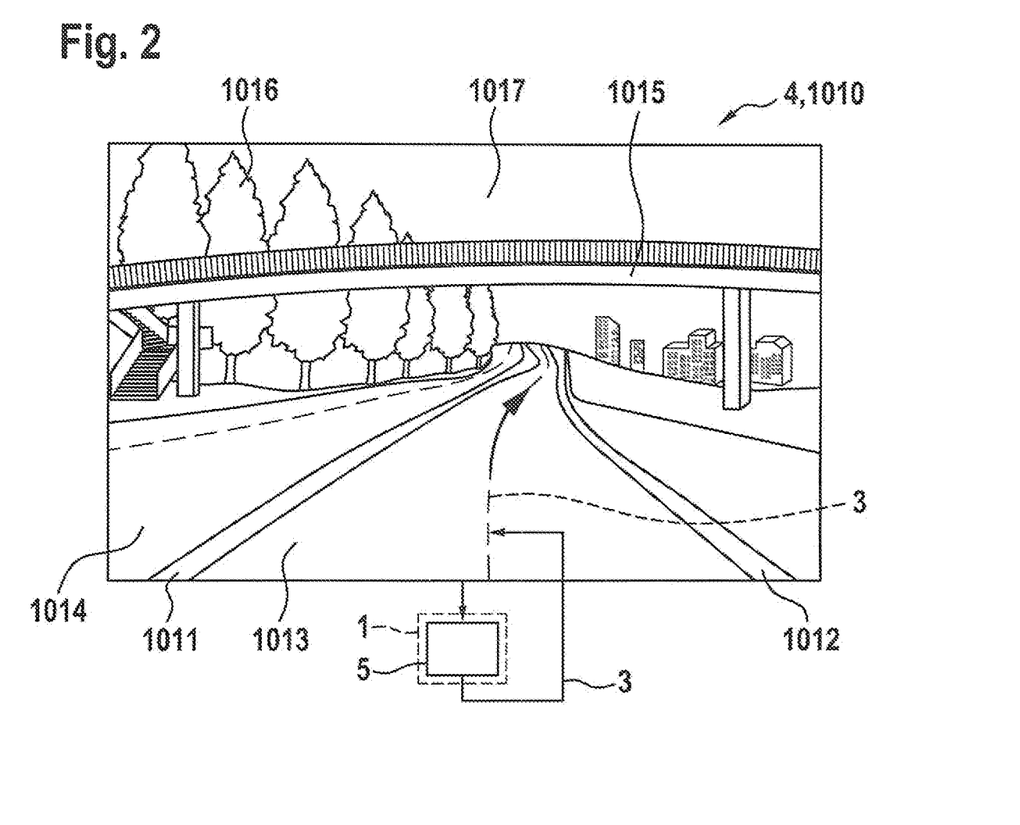
FIG. 2 shows an apparatus for determining a motion path of an ego vehicle according to an example embodiment of the present invention.

FIG. 2 shows an exemplifying embodiment of apparatus 1 for determining motion path 3 of the ego vehicle using an ANN 5. This ANN 5 can be combined, for example, with ANNs 5a, 5b in accordance with FIG. 1 in order to determine, based on a single image 4, both boundary line 20 of drivable region 2 and motion path 3 of the ego vehicle.

In FIG. 2, a different scene 1010 than the one depicted in FIG. 1 is selected specifically in order to illustrate motion path 3. A left roadway marking 1011 and a right roadway marking 1012 delimit a lane 1013. Left roadway marking 1011 furthermore separates lane 1013 from oncoming lane 1014. A bridge 1015 spanning road 1011 to 1014, as well as trees 1016 and lastly a sky 1017, are also evident.

Image 4 is delivered to ANN 5 as input. ANN 5 determines motion path 3 therefrom.

Figure 3A:
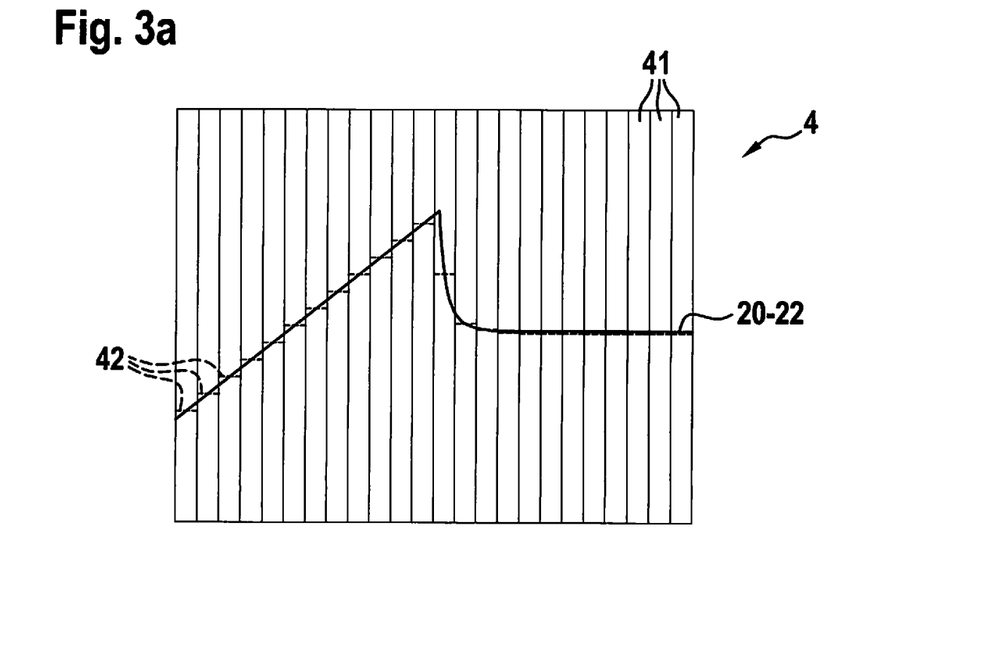
FIG. 3a shows ascertaining of a boundary line by column-wise regression according to an example embodiment of the present invention.

FIG. 3a schematically illustrates the ascertaining of boundary line 20-22 by column-wise regression. Each column 41 of image 4 has associated with it at least one position 42 within column 41 at which the desired boundary line 20-22 proceeds. In the interest of clarity, in FIG. 3a only three columns are labeled with reference character 41, and three positions with reference character 42. The ascertained positions 42 can serve, for example, as interpolation points for fitting a parameterized function with which boundary line 20-22 is ultimately expressed.

Figure 3B:
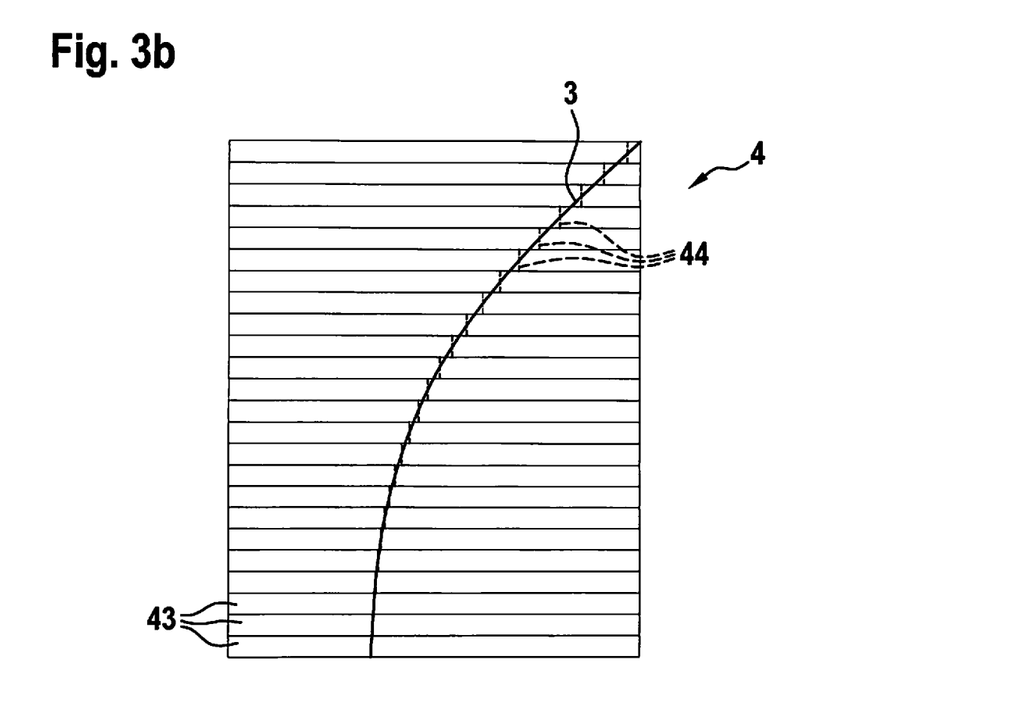
FIG. 3b shows ascertaining a motion path by line-wise regression according to an example embodiment of the present invention.

FIG. 3b schematically illustrates the ascertaining of motion path 3 by row-wise regression. Each row 43 of image 4 has associated with it at least one position 44 within row 43 at which the desired motion path 3 proceeds. In the interest of clarity, in FIG. 3b only three rows are labeled with reference character 43, and three positions with reference character 44. Analogously to FIG. 3a, positions 44 can serve as interpolation points for fitting a parameterized function with which motion path 3 is ultimately expressed.

Figure 4A:
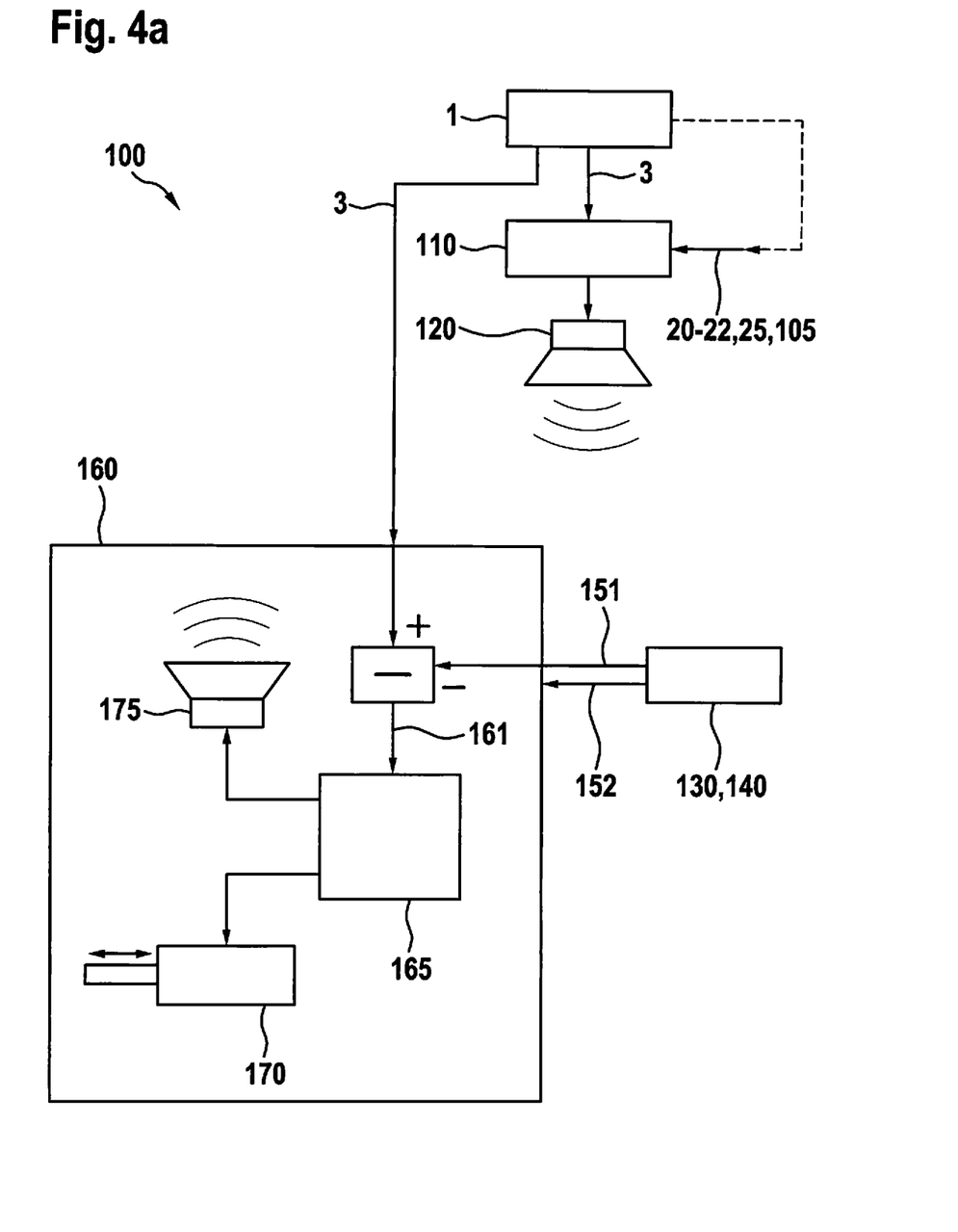
FIG. 4a shows assistance systems monitoring a motion path according to an example embodiment of the present invention.

FIG. 4a shows an exemplifying embodiment of assistance system 100 that serves to monitor motion path 3. Here a comparison unit 110 checks whether motion path 3 ascertained by apparatus 1 lies within tolerance band 105, such that tolerance band 105 can be defined, for example, at least partly by boundary line 20-22, 25 identified by apparatus 1. For example, tolerance band 105 can be determined by roadway markings 1011 and 1012 plotted in FIG. 2.

If tolerance band 105 is breached, an acoustic, optical, or haptic warning device 120 is activated in order to draw the attention of a possibly distracted or fatigued driver.

Alternatively or also in combination, motion path 3 ascertained by apparatus 1 is delivered to control loop 160 that receives, from a sensor 130 and/or an interface 140, information regarding heading 151 of the vehicle. A deviation of motion path 3 from heading 151 is evaluated as a system deviation 161. That system deviation 161 is corrected by activation 165 of an actuator 170, and/or of a further acoustic, optical, or haptic warning device 175, as a control intervention. Some possible causes of a system deviation 161 are skidding of the vehicle, a spin, hydroplaning, and a strong side wind. The actuator can act, for example, on the steering, on the ESP that brakes individual wheels, and/or on the clutch.

Figure 4B:
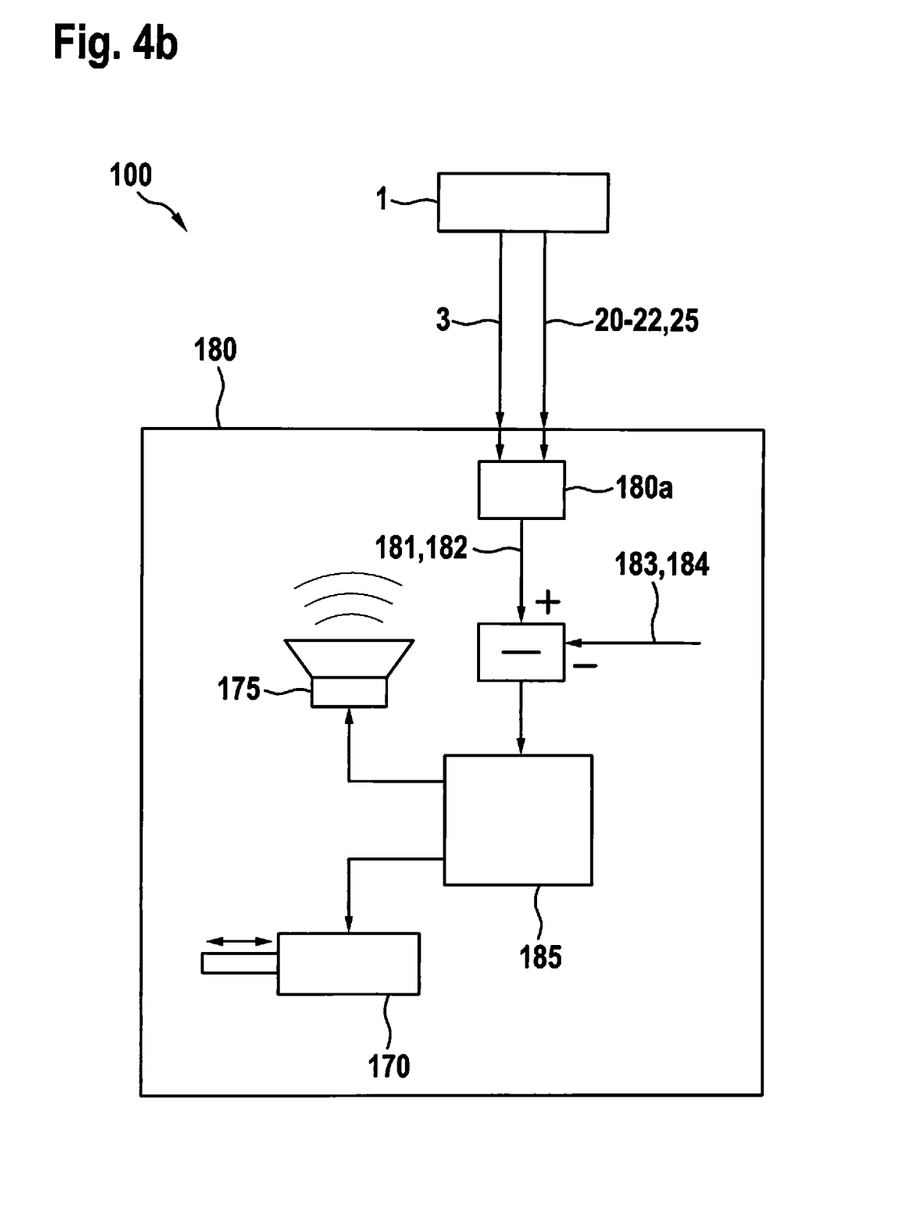
FIG. 4b shows assistance systems monitoring the distance or time to a boundary line according to an example embodiment of the present invention.

FIG. 4b shows a further exemplifying embodiment of assistance system 100. This exemplifying embodiment is embodied to monitor and regulate the remaining distance 181 and/or remaining time 182 until boundary line 20-22, 25 ascertained by apparatus 1 is reached.

For that purpose, both boundary line 20-22, 25 and motion path 3 are delivered to control loop 180 of assistance system 100. In an evaluation unit 180a of control loop 180, the remaining distance 181 and/or remaining time 182 until boundary line 20-22, 25 is reached is ascertained from boundary line 20-22, 25 and from motion path 3. The remaining distance 181 and/or remaining time 182 is compared with the relevant setpoint 183 and/or with the relevant minimum level 184. Analogously to FIG. 4a, an activation 185 of an actuator 170 and/or of an optical, acoustic, or haptic warning device 175 is accomplished as an adjusting action on control loop 180 in order to compensate for corresponding deficits.

What is claimed is:

1. An apparatus for ascertaining from at least one image a delimited region delimiting a drivable region for a vehicle that it is devoid of specific objects with which a collision is to be avoided, the apparatus comprising:
   a first artificial neural network (ANN) configured to determine a boundary line between the delimited region and a first single object type delimiting the delimited region, the first single object type being roadway boundaries; and
   a second ANN configured to determine a boundary line between the delimited region and a second single object type delimiting the delimited region, the second single object type being other vehicles;
   wherein at least one of the first or second ANNs includes:
      a first layer configured to receive as input at least a part of the at least one image; and
      a second layer configured to supply as output the boundary line between the delimited region and the respective first or second object type or a portion thereof;
      wherein a dimensionality of the second layer is lower than a dimensionality of the first layer.

2. The apparatus of claim 1, further comprising an aggregator, wherein the aggregator is configured to ascertain, as a boundary line of the delimited region, an envelope of a superposition of the boundary lines determined by the first and second ANNs.

3. The apparatus of claim 2, wherein the apparatus is configured to ascertain, for a plurality of positions along the ascertained boundary line of the delimited region, respective probabilities that the delimited region is bounded at the respective position by specific object types.

4. The apparatus of claim 1, wherein at least one of the first or second ANNs is configured to supply the boundary line or a portion thereof as a parameter set for a representation of a line at least one of (a) with a parameterized function and (b) in vector graphics.

5. The apparatus of claim 1, wherein at least one of the first or second ANNs is configured to associate with each of at least a subset of a plurality of columns of the image at least one position within the respective column at which a boundary line of the delimited region is located.

6. The apparatus of claim 1, wherein at least one of the first or second ANNs is configured to ascertain, over at least one line segment that traverses the image, a first occurrence of a boundary line of the delimited region.

7. The apparatus of claim 1, wherein the first ANN is trained to recognize the first single object type, and the second ANN is trained to recognize the second single object type.

8. The apparatus of claim 1, wherein the at least one ANN further ascertains from the at least one image a motion path of a vehicle.

9. The apparatus of claim 8, wherein at least one of the first or second ANNs is configured to associate with each of at least a subset of a plurality of rows of the image at least one position within the respective row at which the motion path is located.

10. An assistance system for at least one of monitoring and controlling motion of a vehicle or object, the system comprising an apparatus for ascertaining from at least one image a delimited region delimiting a drivable region for a vehicle that it is devoid of specific objects with which a collision is to be avoided, the apparatus comprising:
  a first artificial neural network (ANN) configured to determine a boundary line between the delimited region and a first single object type delimiting the delimited region, the first single object type being roadway boundaries; and
  a second ANN trained to determine a boundary line between the delimited region and a second single object type delimiting the delimited region, the second single object type being other vehicles;
  wherein at least one of the first or second ANNs includes:
    a first layer configured to receive as input at least a part of the at least one image; and
    a second layer configured to supply as output the boundary line between the delimited region and the respective first or second object type or a portion thereof;
    wherein a dimensionality of the second layer is lower than a dimensionality of the first layer.

11. The assistance system of claim 10, wherein a control loop is configured to activate at least one of (a) at least one actuator, (b) at least one optical apparatus, (c) at least one acoustic apparatus, and (d) as least one haptic indicating apparatus to at least one of (a) regulate to a setpoint and (b) keep above a minimum level at least one of a remaining distance and a remaining time until the boundary line ascertained by the apparatus is reached.

12. The assistance system of claim 10, wherein the at least one ANN further ascertains from the at least one image a motion path of a vehicle.

13. The assistance system of claim 12, further comprising a comparator, wherein the comparator is configured to:
  monitor whether the motion path ascertained by the apparatus proceeds within a tolerance band; and
  activate an acoustic, optical, or haptic warning device if the tolerance band is breached.

14. The assistance system of claim 13, wherein the tolerance band is defined at least partly by the boundary line ascertained by the apparatus.

15. The assistance system of claim 12, further comprising at least one of (a) one or more sensors and (b) an interface for sensing one or both of a heading and a speed of the vehicle.

16. The assistance system of claim 15, wherein a control loop is configured to correct a deviation between the motion path ascertained by the apparatus and the sensed heading by activating at least one of (a) at least one actuator, (b) at least one optical apparatus, (c) at least one acoustic apparatus, and (d) as least one haptic indicating apparatus.

17. A non-transitory computer-readable medium on which are stored instructions that are executable by a processor of a computer and that, when executed by the processor, cause the computer to function as at least one artificial neural network (ANN) for ascertaining from at least one image a delimited region delimiting a drivable region for a vehicle that it is devoid of specific objects with which a collision is to be avoided, the at least one ANN including:
  a first artificial neural network (ANN) configured to determine a boundary line between the delimited region and a first single object type delimiting the delimited region, the first single object type being roadway boundaries; and
  a second ANN configured to determine a boundary line between the delimited region and a second single object type delimiting the delimited region, the second single object type being other vehicles;
  wherein at least one of the first or second ANNs includes:
    a first layer configured to receive as input at least a part of the at least one image; and
    a second layer configured to supply as output the boundary line between the delimited region and the respective first or second object type or a portion thereof, wherein a dimensionality of the second layer is lower than a dimensionality of the first layer.

18. The non-transitory computer-readable medium of claim 17, wherein the instructions, when executed by the processor, further cause the processor to execute a control loop to activate at least one of (a) at least one actuator, (b) at least one optical apparatus, (c) at least one acoustic apparatus, and (d) as least one haptic indicating apparatus to at least one of (a) regulate to a setpoint and (b) keep above a minimum level at least one of a remaining distance and a remaining time until the ascertained boundary line is reached.

19. The non-transitory computer-readable medium of claim 17, wherein the at least one ANN further ascertains from the at least one image a motion path of a vehicle.

20. The non-transitory computer-readable medium of claim 19, wherein the instructions, when executed by the processor, further cause the processor to:
  monitor whether the ascertained motion path proceeds within a tolerance band; and
  activate an acoustic, optical, or haptic warning device if the tolerance band is breached.

21. The non-transitory computer-readable medium of claim 20, wherein the tolerance band is defined at least partly by the ascertained boundary line.

22. The non-transitory computer-readable medium of claim 19, wherein the instructions, when executed by the processor, further cause the processor to execute a control loop to correct a deviation between the ascertained motion path and a sensed vehicle heading by activating at least one of (a) at least one actuator, (b) at least one optical apparatus, (c) at least one acoustic apparatus, and (d) as least one haptic indicating apparatus.

* * * * *